US008983662B2

(12) United States Patent
Moore

(10) Patent No.: US 8,983,662 B2
(45) Date of Patent: Mar. 17, 2015

(54) ROBOTS COMPRISING PROJECTORS FOR PROJECTING IMAGES ON IDENTIFIED PROJECTION SURFACES

(75) Inventor: Douglas Alan Moore, Alameda, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 188 days.

(21) Appl. No.: 13/566,219

(22) Filed: Aug. 3, 2012

(65) Prior Publication Data
US 2014/0039677 A1    Feb. 6, 2014

(51) Int. Cl.
G06N 3/00    (2006.01)
G06K 9/00    (2006.01)
G09G 3/00    (2006.01)
H04N 9/31    (2006.01)

(52) U.S. Cl.
CPC .......... *H04N 9/3194* (2013.01); *G06K 9/00362* (2013.01); *G09G 3/002* (2013.01); *H04N 9/3179* (2013.01)
USPC ...................................................... 700/258

(58) Field of Classification Search
CPC ......... H04N 7/15; H04N 7/144; B25J 19/023; B25J 5/007; G06F 3/011; G03H 2001/0088
USPC ...................................................... 700/245
See application file for complete search history.

(56) References Cited

U.S. PATENT DOCUMENTS

| | | | |
|---|---|---|---|
| 6,292,713 B1 * | 9/2001 | Jouppi et al. ............... | 700/245 |
| 6,625,299 B1 * | 9/2003 | Meisner et al. ............. | 382/103 |
| 6,845,297 B2 * | 1/2005 | Allard ......................... | 700/259 |
| 7,119,829 B2 * | 10/2006 | Leonard et al. ............. | 348/14.16 |
| 8,020,657 B2 * | 9/2011 | Allard et al. ................. | 180/167 |
| 8,594,840 B1 * | 11/2013 | Chiappetta et al. .......... | 700/245 |
| 2002/0057279 A1 * | 5/2002 | Jouppi .......................... | 345/619 |
| 2002/0063726 A1 * | 5/2002 | Jouppi .......................... | 345/660 |
| 2005/0192721 A1 * | 9/2005 | Jouppi .......................... | 701/24 |
| 2005/0207618 A1 * | 9/2005 | Wohler et al. ............... | 382/103 |
| 2006/0195226 A1 * | 8/2006 | Matsukawa et al. ......... | 700/245 |
| 2008/0273079 A1 * | 11/2008 | Campbell et al. ........... | 348/14.08 |

(Continued)

FOREIGN PATENT DOCUMENTS

| | | |
|---|---|---|
| JP | 2006212717 | 8/2006 |
| WO | WO2009063318 | 5/2009 |
| WO | WO2012061932 | 5/2012 |

*Primary Examiner* — John R Olszewski
*Assistant Examiner* — James M McPherson
(74) *Attorney, Agent, or Firm* — Dinsmore & Shohl LLP

(57) ABSTRACT

Robots including projectors for projecting images on identified projection surfaces are disclosed. A robot includes a housing, an electronic control unit coupled to the housing, a projector coupled to the housing, a human recognition module coupled to the housing, and a projection surface identification module coupled to the housing. The projector, the human recognition module, and the surface identification module are communicatively coupled with the electronic control unit. The electronic control unit includes a non-transitory memory that stores a set of machine readable instructions and a processor for executing the machine readable instructions. When executed by the processor, the machine readable instructions cause the robot to recognize a human using the human recognition module, identify a projection surface using the projection surface recognition module, and project an image on the identified projection surface with the projector.

20 Claims, 5 Drawing Sheets

(56) References Cited

U.S. PATENT DOCUMENTS

| | | |
|---|---|---|
| 2008/0298571 A1* | 12/2008 | Kurtz et al. .................... 379/156 |
| 2010/0067571 A1* | 3/2010 | White et al. ............. 375/240.01 |
| 2010/0225735 A1* | 9/2010 | Shaffer et al. ............. 348/14.08 |
| 2010/0245535 A1* | 9/2010 | Mauchly .................... 348/14.08 |
| 2010/0268383 A1* | 10/2010 | Wang et al. .................... 700/248 |
| 2011/0228040 A1* | 9/2011 | Blanche et al. ............ 348/14.07 |
| 2011/0288684 A1* | 11/2011 | Farlow et al. ................. 700/264 |
| 2011/0301760 A1* | 12/2011 | Shuster et al. ................ 700/264 |
| 2012/0038739 A1* | 2/2012 | Welch et al. ............... 348/14.01 |
| 2012/0056988 A1* | 3/2012 | Stanhill et al. .................. 348/46 |
| 2012/0069131 A1* | 3/2012 | Abelow .................... 348/14.01 |
| 2012/0185095 A1* | 7/2012 | Rosenstein et al. ........... 700/259 |
| 2012/0194517 A1* | 8/2012 | Izadi et al. ..................... 345/420 |
| 2012/0226394 A1* | 9/2012 | Marcus ............................. 701/2 |
| 2012/0281092 A1* | 11/2012 | Olivier et al. ................. 348/148 |
| 2012/0327177 A1* | 12/2012 | Kee et al. ................... 348/14.08 |
| 2013/0083154 A1* | 4/2013 | Kim et al. .................. 348/14.08 |
| 2013/0138247 A1* | 5/2013 | Gutmann et al. ............. 700/253 |
| 2013/0182130 A1* | 7/2013 | Tran .......................... 348/207.1 |
| 2013/0300637 A1* | 11/2013 | Smits et al. ...................... 345/8 |
| 2013/0325029 A1* | 12/2013 | Hourtash et al. .............. 606/130 |
| 2013/0325030 A1* | 12/2013 | Hourtash et al. .............. 606/130 |
| 2013/0335507 A1* | 12/2013 | Aarrestad et al. ........... 348/14.08 |
| 2014/0009561 A1* | 1/2014 | Sutherland et al. ......... 348/14.05 |
| 2014/0055556 A1* | 2/2014 | White ........................ 348/14.16 |

* cited by examiner

ROBOTS COMPRISING PROJECTORS FOR PROJECTING IMAGES ON IDENTIFIED PROJECTION SURFACES

TECHNICAL FIELD

The present specification generally relates to robots and, more specifically, robots comprising projectors for projecting images on identified projection surfaces.

BACKGROUND

Robots, such as telepresence robots, may communicate image data to a human in the physical environment of the robot (e.g., image data of a remote party communicating via a telepresence robot to a party in the physical presence of the telepresence robot) by displaying the image data on a monitor, television, screen, display, or the like, for example. However, in the case where the image data is projected, it may be difficult to identify an appropriate surface on which to project the image data so that one or more humans communicating with the robot may easily view the projected image. For example, projection surfaces may be small, obstructed by objections, or behind one or more people in the physical environment.

Accordingly, a need exists for alternative robots comprising projectors for projecting images on identified projection surfaces.

SUMMARY

In one embodiment, a robot includes a housing, an electronic control unit coupled to the housing, a projector coupled to the housing, a human recognition module coupled to the housing, and a projection surface identification module coupled to the housing. The projector, the human recognition module, and the surface identification module are communicatively coupled with the electronic control unit. The electronic control unit includes a non-transitory memory that stores a set of machine readable instructions and a processor for executing the machine readable instructions. When executed by the processor, the machine readable instructions cause the robot to recognize a human using the human recognition module, identify a projection surface using the projection surface recognition module, and project an image on the identified projection surface with the projector.

In another embodiment, a robot includes a housing, an electronic control unit coupled to the housing, a projector coupled to the housing, and a camera coupled to the housing. The projector and the camera are communicatively coupled with the electronic control unit. The electronic control unit comprises a non-transitory memory that stores a set of machine readable instructions and a processor for executing the machine readable instructions. When executed by the processor, the machine readable instructions cause the robot to recognize a human using the camera, identify a projection surface using the camera, and project an image on the identified projection surface with the projector.

In yet another embodiment, a robot includes a housing, an electronic control unit coupled to the housing, a projector coupled to the housing, a microphone coupled to the housing, and a camera coupled to the housing. The projector, the microphone, and the camera are communicatively coupled to the electronic control unit. The electronic control unit includes a non-transitory memory that stores a set of machine readable instructions and a processor for executing the machine readable instructions. When executed by the processor, the machine readable instructions cause the robot to recognize a human based on a mechanical vibration received by the microphone and transforming the mechanical vibration into a signal indicative of human speech that is transmitted to the electronic control unit, identify a projection surface using the camera, and project an image on the identified projection surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 5:
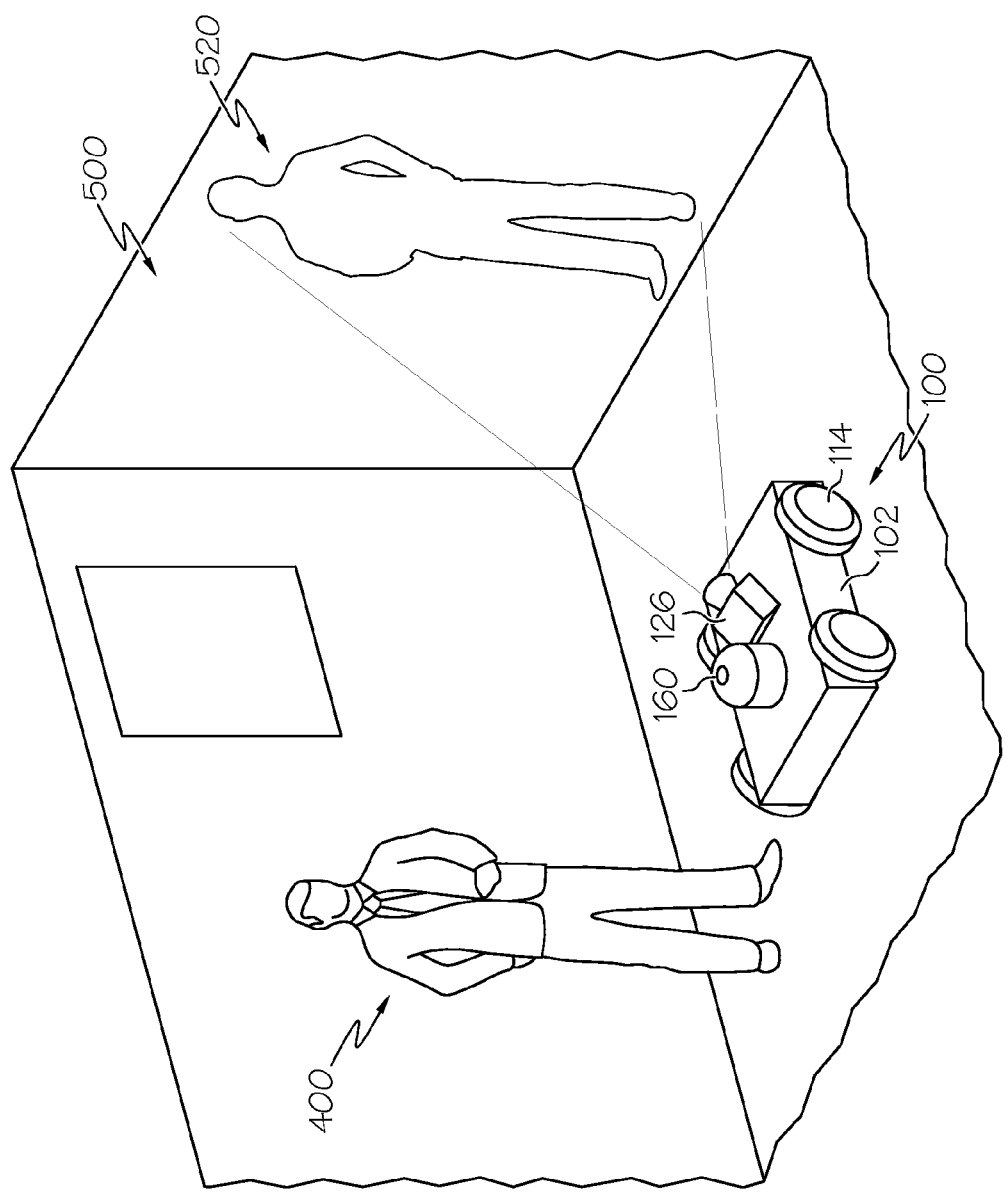
FIG. 5 schematically depicts a perspective view of a wheeled robot projecting an image on a surface viewable by a human, according to one or more embodiments shown and described herein.

The embodiments disclosed herein generally include robots comprising projectors for projecting images on identified surfaces. Referring generally to FIG. 5, a robot may recognize a human in the physical environment of the robot, identify a projection surface viewable by the human onto which an image may be projected, and project an image on the identified surface, such as an image of a human, a face, an avatar representative of the robot, or the like. More specifically, embodiments generally include a housing, an electronic control unit coupled to the housing, and a projector coupled to the housing and communicatively coupled with the housing. Embodiments generally recognize a human, identify a projection surface, and project an image on the identified projection surface with the projector. Some embodiments include a human recognition module coupled to the housing and communicatively coupled with the electronic control unit for recognizing the human, and a projection surface identification module coupled to the housing and communicatively coupled with the electronic control unit for identifying the projection surface. Other embodiments include a camera coupled to the housing and communicatively coupled with the electronic control unit for recognizing the human and identifying the projection surface. Still other embodiments include a microphone coupled to the housing and communicatively coupled with the electronic control unit for recognizing the human and a camera coupled to the housing and communicatively coupled with the electronic control unit for identifying the projection surface. The various robots for projecting images on identified surfaces will be described in more detail herein with specific reference to the corresponding drawings.

Figure 1:
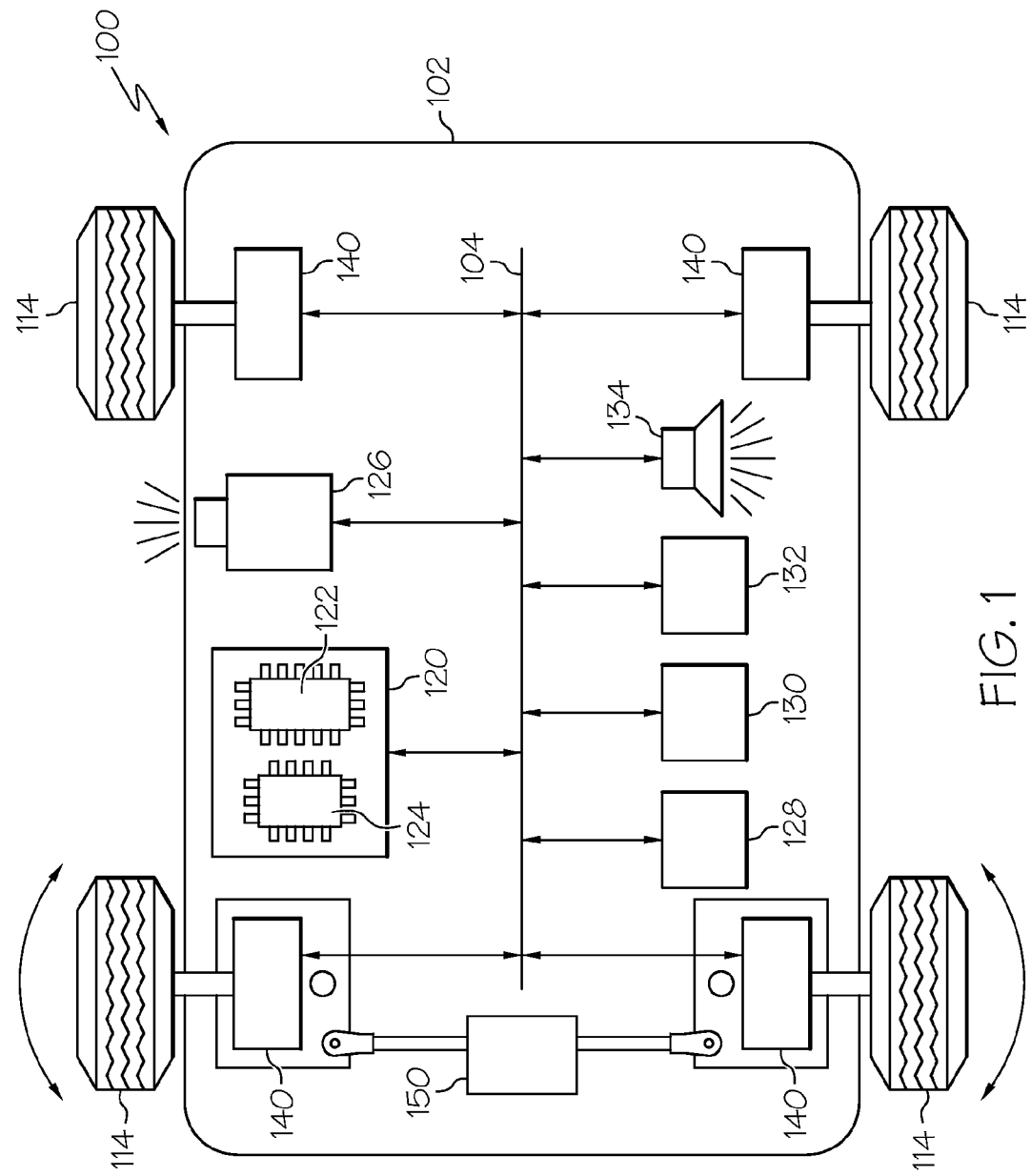
FIG. 1 schematically depicts a robot for projecting images on identified surfaces, according to one or more embodiments shown and described herein.

Referring now to the drawings, FIG. 1 schematically depicts an embodiment of a robot 100 for projecting images on identified surfaces. The robot 100 comprises a housing 102 to which the various components of the robot 100 are coupled. The robot 100 depicted in FIG. 1 includes a plurality of drive wheels 114 rotatably coupled to the housing 102 operable to move the robot 100. However, it should be understood that in other embodiments, the robot 100 may be configured to move in a manner other than utilizing wheels. For example, the robot 100 may be any other type of robot including, but not limited to, a robot with drive tracks, a robot with legs, an aquatic robot, and a flying robot (e.g., an airplane robot, a helicopter robot, a blimp robot, etc.). It should also be understood that in some embodiments, the housing 102 may enclose some or all of the components of the robot 100. In other embodiments, at least some of the components of the robot 100 may be coupled to an outside surface of the housing 102.

The housing 102 includes an electronic control unit 120 coupled to the housing 102. The electronic control unit 120 includes an electronic memory 122 that stores a set of machine readable instructions and a processor 124 for executing machine readable instructions. The electronic memory 122 may comprise RAM, ROM, flash memories, hard drives, or any device capable of storing machine readable instructions such that the machine readable instructions can be accessed by the processor 124. The machine readable instructions comprise logic or algorithm(s) written in any programming language of any generation (e.g., 1GL, 2GL, 3GL, 4GL, or 5GL) such as, for example, machine language that may be directly executed by the processor 124, or assembly language, object-oriented programming (OOP), scripting languages, microcode, etc., that may be compiled or assembled into machine readable instructions and stored in the electronic memory 122. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The electronic memory 122 may be implemented as one memory module or a plurality of memory modules.

The processor 124 may be any device capable of executing machine readable instructions. For example, the processor 124 may be an integrated circuit, a microchip, a computer, or any other computing device. The electronic memory 122 and the processor 124 are coupled to a communication path 104 that provides signal interconnectivity between various components and/or modules of the robot 100. Accordingly, the communication path 104 may communicatively couple any number of processors with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

In the embodiments described herein, the electronic memory 122 and the processor 124 are integral with the electronic control unit 120. However, it is noted that the electronic control unit 120, the electronic memory 122, and the processor 124 may be discrete components communicatively coupled to one another without departing from the scope of the present disclosure.

As schematically depicted in FIG. 1, the communication path 104 communicatively couples the electronic control unit 120 with a plurality of other components of the robot 100. For example, the embodiment of the robot 100 depicted in FIG. 1 includes an electronic control unit 120 communicatively coupled to: a projector 126, a human recognition module 128, a projection surface identification module 130, a wireless communicator 132, a speaker 134, a plurality of drive motors 140 coupled to the plurality of drive wheels 114, and a steering mechanism 150 coupled to at least one of the drive wheels 114.

The projector 126 may be any device capable of transforming a data signal into an optical output, such as an image to be projected on a surface. In some embodiments, the projector 126 may include one or more processors and one or more memories. In other embodiments, the projector 126 may omit a processor and/or a memory. In some embodiment, the projector 126 may be a compact, low-power projector, such as a pico projector.

The human recognition module 128 may be any device capable of facilitating the identification of a human in the physical presence of the robot 100. In some embodiments, as will be explained more fully below, the human recognition module 128 may also identify a location of one or more people, which may be used to determine an appropriate projection surface. In other embodiments, the human recognition module 128 is a camera communicatively coupled to the electronic control unit 120. In such embodiments, the electronic control unit 120 may recognize a human in the physical presence of the robot 100 by employing facial recognition algorithms on images detected by the camera. In other embodiments, the human recognition module 128 is a microphone communicatively coupled to the electronic control unit 120. In such embodiments, the electronic control unit 120 may recognize a human in the physical presence of the robot 100 by receiving a mechanical vibration at the microphone and transforming the received mechanical vibration into a signal indicative of human speech. In some embodiments, as will be explained more fully below, the location and/or orientation of the human may be determined based on a direction of the received mechanical vibration. It should be understood that in other embodiments, the human recognition module 128 may be a device other than a camera or a microphone that facilitates the recognition of a human, such as an object sensor, a heat sensor, a pressure sensor, a carbon dioxide sensor, etc.

The projection surface identification module 130 may be any device capable of facilitating the identification of an appropriate projection surface for the robot 100 to project an image with the projector 126. In some embodiments, the projection surface identification module 130 is a camera communicatively coupled to the electronic control unit 120. In such an embodiment, the electronic control unit 120 may recognize a one or more possible projection surfaces by processing an image detected by the camera. From the one or more possible projection surfaces, the electronic control unit 120 may identify a projection surface onto which to project an image. In other embodiments, the projection surface identification module 130 may be a device other than a camera that facilitates the identification of a projection surface, such as a depth sensor, an object sensor, a laser sensor, etc. In some embodiments, the projection surface identification module 130 may make reference to a known map stored in the electronic memory 122. In some embodiments, the projection surface identification module 130 may facilitate the identification of a plurality of potential projection surfaces and identify a best projection surface of the plurality of potential projection surfaces based on one or more determined characteristics of each potential projection surface (e.g., surface color, texture, reflectivity, size, shape, etc.).

The wireless communicator 132 may be any device capable of wireless communication. The wireless communicator 132 may include a communication transceiver for sending and/or receiving data according to any wireless communication standard. For example, the network interface hardware 118 may include a chipset (e.g., antenna, processors, machine readable instructions, etc.) to communicate with another device (e.g., a computer or a mobile device), over wireless computer networks such as, for example, a personal area network, a local area network, a wide area network, a cellular network, wireless fidelity (Wi-Fi), WiMax, Bluetooth, IrDA, Wireless USB, Z-Wave, ZigBee, or the like. Some embodiments of the robot 100 may not include the wireless communicator 132.

The speaker 134 may be any device capable of transforming data signals transmitted on the communication path 104 into mechanical vibrations, such as in order to provide an audible indication of information communicated from the robot 100 to a human in the physical presence of the robot 100. Some embodiments of the robot 100 may not include the speaker 134.

As shown in FIG. 1, the robot 100 comprises a movement mechanism comprising one or more drive wheels 114 and one or more drive motors 140. The drive wheel 114 is rotatably coupled to the housing 102. The drive motor 140 is coupled to the drive wheel 114 such that the drive motor 140 rotates the drive wheel 114 to move the robot 100. In some embodiments, the drive motor 140 is a battery powered electric motor that provides rotational energy to the drive wheel. In other embodiments, a single drive motor 140 may rotate multiple wheels to propel the device. While the embodiment depicted in FIG. 1 includes a plurality of drive wheels 114, each of which is coupled to a drive motor 140, in other embodiments, one or more of the drive wheels 114 may not be coupled to a separate drive motor 140, such as when one drive motor 140 drives multiple drive wheels 114. In still other embodiments, one or more of the drive wheels 114 may not be coupled to a drive motor 140, such as in an embodiment in which drive wheels 114 located in a front of the robot 100 are coupled to a drive motor 140, but wheels located in a rear of the robot 100 are not coupled to a drive motor 140.

The robot 100 comprises a steering mechanism 150 coupled to the housing 102. The steering mechanism 150 directs the course of the robot 100 as the robot 100 moves. The steering mechanism may be a mechanical linkage for turning one or more of the drive wheels 114, a rack and pinion, a recirculating ball mechanism, an omni wheel, a mecanum wheel, or any other device suitable for directing the course of the robot 100 as the robot 100 moves.

Figure 4:
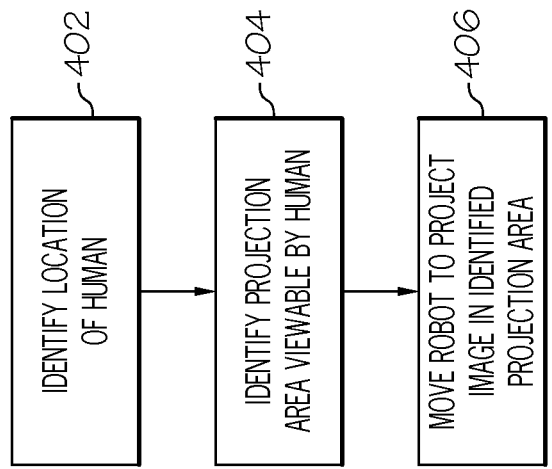
FIG. 4 schematically depicts a flowchart for moving a robot to project an image on an identified projection surface viewable by a human, according to one or more embodiments shown and described herein.

While the robot 100 depicted in FIG. 1 includes a wheeled movement mechanism, in other embodiments, the robot 100 may include a movement mechanism other than a wheeled movement mechanism. For example, in some embodiments, the robot 100 may include a helicopter movement mechanism, which may include one or more rotors 320 coupled to one or more drive motors, as depicted in FIG. 4.

Figure 2:
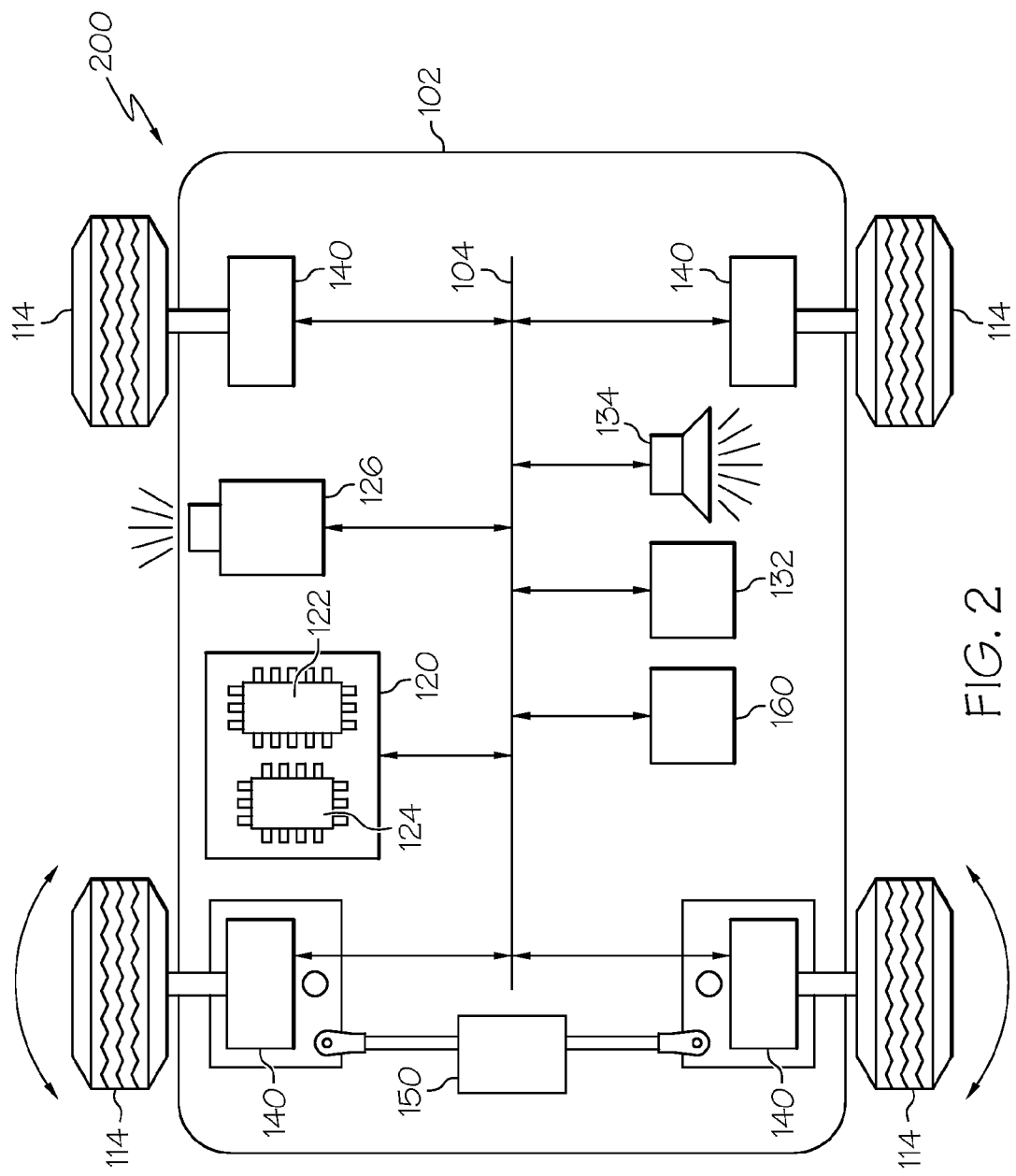
FIG. 2 schematically depicts a robot for projecting images on identified surfaces, according to one or more embodiments shown and described herein.

Referring now to FIG. 2, another embodiment of a robot 200 for projecting images on identified surfaces is schematically depicted. The robot 200 depicted in FIG. 2 differs from the robot 100 depicted in FIG. 1 because the robot 200 of FIG. 2 includes a camera 160 communicatively coupled to the electronic control unit 120, in place of the human recognition module 128 and the projection surface identification module 130 of the robot 100 of FIG. 1. In the embodiment of FIG. 2, the camera 160 of the robot 200 facilitates both the recognition of a human in the physical presence of the robot 200 and the identification of an appropriate projection surface for the robot 200 to project an image with the projector 126. The camera 160 may facilitate the recognition of a human in the physical presence of the robot 200 by employing facial recognition algorithms on images detected by the camera 160, for example. The camera 160 may facilitate the identification of an appropriate projection surface based on an image received from the camera 160. The other depicted components of the robot 200 are substantially similar to the like numbered components of the robot 100, described above with reference to FIG. 1

Figure 3:
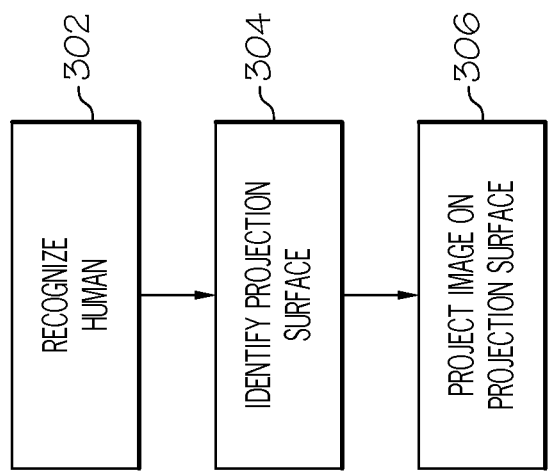
FIG. 3 schematically depicts a flowchart for projecting an image on an identified projection surface viewable by a human, according to one or more embodiments shown and described herein.

Referring now to FIG. 3, a flowchart for projecting an image on an identified projection surface viewable by a human is schematically depicted. Machine readable instructions for recognizing a human (block 302), identifying a projection surface (block 304), and projecting an image (block 306) are stored in the electronic memory 122. In an embodiment comprising a human recognition module (such as the robot 100 of FIG. 1), when executed by the processor 124, the machine readable instructions for recognizing a human cause the robot to recognize a human using the human recognition module 128 in block 302. In an embodiment in which the human recognition module 128 comprises a camera or an embodiment lacking the human recognition module 128 and including a camera 160 (such as the robot 200 of FIG. 2), the machine readable instructions of block 302 may cause the robot to recognize the human by receiving an input image from the camera and processing the input image using facial recognition algorithms to recognize a human. In some embodiments, the Eigenfaces facial recognition algorithm may be employed to recognize the human. In other embodiments, a facial recognition algorithm other than the Eigenfaces algorithm may be used, such as principal component analysis algorithm, an independent component analysis algorithm, a linear discriminate analysis algorithm, etc. In an embodiment in which the human recognition module 128 comprises a microphone, the machine readable instructions may cause the robot to recognize the human by processing a signal received from the microphone using a voice recognition algorithm, such as a universal background model based algorithm or a joint factor analysis based algorithm.

Still referring to FIG. 3, in an embodiment comprising a projection surface identification module 130 (such as the robot 100 of FIG. 1), when executed by the processor 124, the machine readable instructions for identifying a projection surface cause the robot to identify a projection surface using the projection surface identification module 130 in block 304. In an embodiment in which the projection surface identification module 130 comprises a camera or an embodiment lacking the projection surface identification module 130 and including a camera 160 (such as the robot 200 of FIG. 2), the machine readable instructions may cause the robot to identify a projection surface by receiving an input image from the camera and processing the input image using projection surface identification algorithms. The projection surface identification algorithms may identify the projection surface based on surface color, texture, reflectivity, size, shape, etc. In some embodiments, the machine readable instructions may cause the robot to identify a plurality of potential projection surfaces and identify a best projection surface of the plurality of potential projection surfaces based on one or more determined characteristics of each potential projection surface (e.g., surface color, texture, reflectivity, size, shape, etc.). The identified surface may be any surface on which an image may be projected including, but not limited to, a wall, a window, a cubicle, a screen, etc.

When executed by the processor 124, the machine readable instructions for projecting an image cause the robot to project an image on the identified projection surface in block 306. In some embodiments, the projected image may be of a remote communicating party utilizing the robot 100 to communicate with a receiving party located in the physical environment of the robot 100. In some embodiments, the projected image may include the entire body of the communicating party. In other embodiments, the projected image may include only a portion of the body of the communicating party, such as the face of the communicating party. In still other embodiments, the projected image may include a fictional representation of the communicating party, e.g., an avatar or the like. In other embodiments, the projected image may be any other visual information conveyed by the robot 100 for viewing by a human located in the physical environment of the robot 100. In still other embodiments, the projected image may be a visual representation of the robot 100, such as an avatar, for example.

Referring now to FIG. 4, a flowchart for moving a robot to project an image on an identified projection surface viewable by a human is schematically depicted. Machine readable instructions for identifying a location of the human (block 402), identifying a projection area of the projection surface on which the human is capable of viewing the image (block 404), and causing the robot to move to a position in which the image is projected in the identified projection area (block 406) are stored in the electronic memory 122. In an embodiment comprising a human recognition module 128 (such as the robot 100 of FIG. 1), when executed by the processor, the machine readable instructions for identifying a location of the human may use the human recognition module 128 to identify the location of the human in block 402. In an embodiment in which the human recognition module 128 comprises a camera or an embodiment lacking the human recognition module 128 and including a camera 160 (such as the robot 200 of FIG. 2), the machine readable instructions may cause the robot to receive an input image from the camera and process the input image to determine a location of the human relative to a grid system or coordinate system stored in the electronic memory 122. In some embodiments, the grid system or coordinate system is defined relative to map data including information pertaining to the physical environment in which the robot is present. In some embodiments, an orientation of an identified human may be identified in addition to identifying a location of the human by, for example, determining a direction in which the human's eyes are directed by analyzing image data received from the camera.

In an embodiment in which the human recognition module 128 comprises a microphone, the machine readable instructions of block 402 may cause the robot to receive a mechanical vibration and provide a signal indicative of human speech to the electronic control unit 120, which may determine a location and/or orientation of the human based on the received speech signal.

When executed by the processor, the machine readable instructions may cause the robot to identify a projection area of the projection surface on which the human is capable of viewing the image in block 404. In an embodiment comprising a projection surface identification module 130 (such as the robot 100 of FIG. 1), when executed by the processor 124, the machine readable instructions of block 404 cause the robot to identify the projection area on which the human is capable of viewing the image using the projection surface identification module 130. In an embodiment in which the projection surface identification module 130 comprises a camera or an embodiment lacking the projection surface identification module 130 and including a camera 160 (such as the robot 200 of FIG. 2), the machine readable instructions may cause the robot to identify the projection area by receiving an input image from the camera and processing the input image using a projection area identification algorithm. In some embodiments, the projection area identification algorithm may identify the projection area based on the location of the human and/or the orientation of the human such that the human is capable of viewing the image from the human's detected location and orientation.

When executed by the processor, the machine readable instructions may cause the robot to move to a position in which the image is projected in the identified projection area in block 406. Once the desired projection area is identified in block 404, the movement mechanism of the robot may cause the robot to move to a position in which the image is projected in the identified projection area by, in the case of a wheeled robot, rolling and steering to the appropriate location. In some embodiments, the robot may utilize any number of sonar sensors, laser range finders, on-board cameras, and the like for sensing the topographical information. In one example, the electronic memory 122 may stores a map or coordinate system representative of the physical environment in which the robot is present. Sensed topographical information may then transmitted to the electronic control unit 120, which may determine a relative position of the system. Once the relative position is determined, the movement mechanism may guide the robot to the position in which the image is projected in the identified projection area. In some embodiments, the electronic memory 122 may include machine readable instructions that, when executed by the processor 124, cause the robot to detect movement of the human (e.g., by analyzing image data across frames of image data), predict a future location of the human based on the detected movement, and project the image on an area of a projection surface on which the human will be capable of viewing the image from the predicted future location.

In some embodiments, the robot may receive data with the wireless communicator 132. In such embodiments, the projected image may be based on the received data. For example, in some embodiments, the projected image may be based on an image of a remote communicating party received via the wireless communicator 132. In other embodiments, the received data may include other information wirelessly transmitted by a remote communicating party and received by the wireless communicator 132. In still other embodiments, the received data may include information automatically transmitted by a remote computing device and received by the wireless communicator 132. In an embodiment including a speaker 134, the mechanical output of the speaker may be based on information received wirelessly by the wireless communicator 132 (e.g., speech of the communicating party). However, it should be understood that an embodiment with a speaker 134 may communicate audible indications of information other than information received by the wireless communicator 132.

In some embodiments, machine readable instructions for determining a distance between the robot and the projection surface, determining a size of the projection surface, and scaling the projected image based on the determined distance and the determined size, such that the entire projected image is displayed on the projection surface are stored in the electronic memory 122.

Referring now to FIGS. 5 and 2, a perspective view of a wheeled robot 100 projecting an image 520 on a surface 500 viewable by a human 400 is schematically depicted. In order to project the image 520 on the surface 500, the robot 100 has recognized the human 400 using the camera 160 as described above, identified the projection surface 500 using the camera 160 as described above, moved to a proper position, and projected the image 520 on the identified projection surface 500 with the projector 126 as described above.

Figure 6:
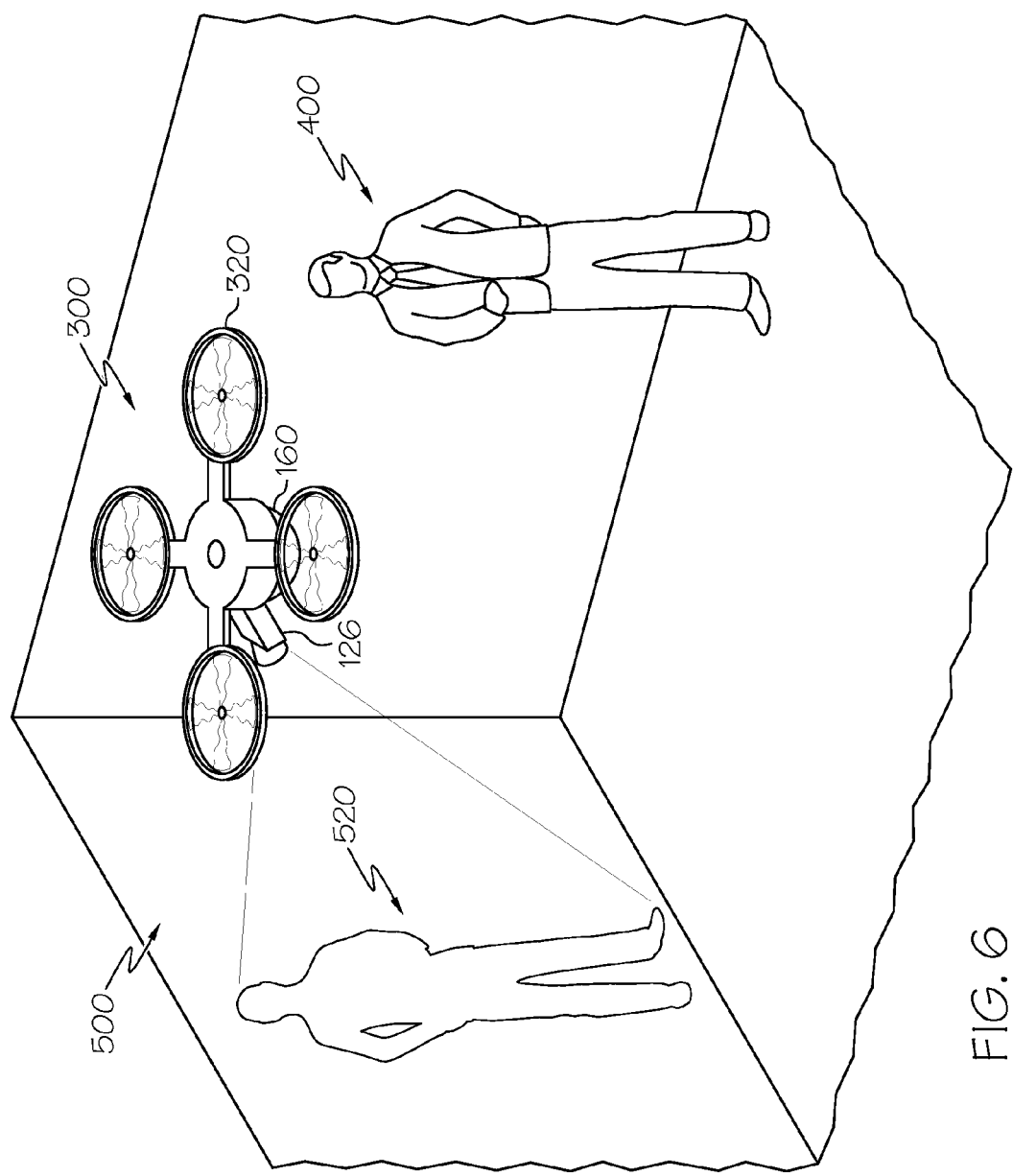
FIG. 6 schematically depicts a perspective view of a flying robot projecting an image on a surface viewable by a human, according to one or more embodiments shown and described herein.

Referring now to FIGS. 6 and 2, a perspective view of a flying robot 300 projecting an image 520 on a surface 500 viewable by a human 400 is schematically depicted. In order to project the image 520 on the surface 500, the flying robot 300 has recognized the human 400 using the camera 160 as described above, identified the projection surface 500 using the camera 160 as described above, moved to a proper position and projected the image 520 on the identified projection surface 500 with the projector 126 as described above.

While the embodiments herein have been described in the context of a single robot projecting an image on identified projection surface, it should be understood that in other embodiments multiple robots may cooperate to project a single image on an identified projection surface. In some embodiments, a plurality of robots may each project a portion of an image on the projection surface, such that the collective portions form a single image. In one embodiment, a first robot, a second robot, a third robot, and a fourth robot may each project a quadrant of an image on the identified projection surface. For example, the first robot may project the upper left quadrant of the image, the second robot may project the upper right quadrant of the image, the third robot may project the lower left quadrant of the image, and the fourth robot may project the lower right quadrant of the image. In some embodiments, multiple wheeled robots may each project a portion of an image on a projection surface, such that the collective portions form a single image. In other embodiments, multiple flying robots may each project a portion of an image on a projection surface, such that the collective portions form a single image. In still other embodiments, a combination of flying robots and wheeled robots may each project a portion of an image on a projection surface, such that the collective portions forma a single image.

It should now be understood that the embodiments described herein relate to robots comprising projectors for projecting images on identified projection surfaces. The embodiments provide a flexible and adaptive robotic projection system capable of identifying an appropriate projection surface for projecting an image to an identified human. In embodiments that do not include the projection surface as a part of the robot, the system may be small, lightweight, power efficient, and inexpensive because a relatively small robot can project a large image on a projection surface.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robot comprising:
   a housing;
   an electronic control unit coupled to the housing, wherein the electronic control unit comprises a non-transitory memory that stores a set of machine readable instructions and a processor for executing the machine readable instructions;
   a projector coupled to the housing and communicatively coupled with the electronic control unit;
   a human recognition module coupled to the housing and communicatively coupled with the electronic control unit; and
   a projection surface identification module coupled to the housing and communicatively coupled with the electronic control unit, wherein when executed by the processor, the machine readable instructions cause the robot to:
   recognize a human using the human recognition module;
   identify a location of the human using the human recognition module;
   identify a projection area based on the identified location of the human using the projection surface recognition module; and
   project an image on the identified projection area with the projector.

2. The robot of claim 1 further comprising a movement mechanism coupled to the housing and communicatively coupled with the electronic control unit, wherein when executed by the processor, the machine readable instructions further cause the robot to:
   cause the movement mechanism to move the robot to a position in which the image is projected on the identified projection area.

3. The robot of claim 2, wherein the movement mechanism comprises:
   a drive wheel rotatably coupled to the housing;
   a drive motor coupled to the drive wheel and communicatively coupled with the electronic control unit; and a steering mechanism coupled to the housing and communicatively coupled with the electronic control unit.

4. The robot of claim 2, wherein the movement mechanism comprises a rotor and a drive motor coupled to the rotor.

5. The robot of claim 1 further comprising a wireless communicator coupled to the housing and communicatively coupled with the electronic control unit, wherein when executed by the processor, the machine readable instructions further cause the robot to:
receive data with the wireless communicator; and
generate the projected image based on the received data.

6. The robot of claim 1, wherein when executed by the processor, the machine readable instructions further cause the robot to:
determine a distance between the robot and the projection area;
determine a size of the projection area; and
scale the projected image based on the determined distance and the determined size, such that the entire projected image is displayed on the projection area.

7. The robot of claim 1 further comprising a movement mechanism coupled to the housing and communicatively coupled with the electronic control unit, wherein when executed by the processor, the machine readable instructions further cause the robot to:
identify an orientation of the human using the human recognition module;
identify the projection area based on the orientation of the human; and
cause the movement mechanism to move the robot to a position in which the image is projected on the identified projection area.

8. The robot of claim 1, wherein the human recognition module comprises a camera communicatively coupled to the electronic control unit and the recognition of the human is based on facial recognition of an image received from the camera.

9. The robot of claim 1, wherein the human recognition module comprises a microphone communicatively coupled to the electronic control unit and the recognition of the human is based on a mechanical vibration received by the microphone and transformed into a signal indicative of human speech that is transmitted to the electronic control unit.

10. The robot of claim 1, wherein the projection surface identification module comprises a camera communicatively coupled to the electronic control unit.

11. The robot of claim 1, wherein the projector is a pico projector.

12. The robot of claim 1, wherein the projected image substantially resembles a human.

13. The robot of claim 1, wherein the projected image comprises a face.

14. The robot of claim 1 further comprising a speaker for providing an audible indication of the received information to the human, wherein the speaker is communicatively coupled to the electronic control unit.

15. A robot comprising:
a housing;
an electronic control unit coupled to the housing, wherein the electronic control unit comprises a non-transitory memory that stores a set of machine readable instructions and a processor for executing the machine readable instructions;
a projector coupled to the housing and communicatively coupled with the electronic control unit; and
a camera coupled to the housing and communicatively coupled with the electronic control unit, wherein when executed by the processor, the machine readable instructions cause the robot to:
recognize a human using the camera;
identify a location of the human using the camera;
identify a projection area based on the identified location of the human using the camera; and
project an image on the identified projection area with the projector.

16. The robot of claim 15 further comprising:
a drive wheel rotatably coupled to the housing;
a drive motor coupled to the drive wheel and communicatively coupled with the electronic control unit; and
a steering mechanism coupled to the housing and communicatively coupled with the electronic control unit, wherein when executed by the processor, the machine readable instructions further cause the robot to:
cause the drive motor to rotate the drive wheel and the steering mechanism to steer the robot to a position in which the image may be projected on the identified projection area.

17. The robot of claim 15 further comprising a wireless communicator coupled to the housing and communicatively coupled with the electronic control unit, wherein when executed by the processor, the machine readable instructions further cause the robot to:
receive data with the wireless communicator; and
generate the projected image based on the received data.

18. A robot comprising:
a housing;
an electronic control unit coupled to the housing, wherein the electronic control unit comprises a non-transitory memory that stores a set of machine readable instructions and a processor for executing the machine readable instructions;
a projector coupled to the housing and communicatively coupled with the electronic control unit;
a microphone coupled to the housing and communicatively coupled with the electronic control unit; and
a camera coupled to the housing and communicatively coupled with the electronic control unit, wherein when executed by the processor, the machine readable instructions cause the robot to:
recognize a human based on a mechanical vibration received by the microphone and transforming the mechanical vibration into a signal indicative of human speech that is transmitted to the electronic control unit;
identify a location of the human using the microphone;
identify a projection area based on the identified location of the human using the camera; and
project an image on the identified projection area with the projector.

19. The robot of claim 18 further comprising a wireless communicator coupled to the housing and communicatively coupled with the electronic control unit, wherein when executed by the processor, the machine readable instructions further cause the robot to:
receive data with the wireless communicator; and
generate the projected image based on the received data.

20. The robot of claim 18 further comprising:
a drive wheel rotatably coupled to the housing;
a drive motor coupled to the drive wheel and communicatively coupled with the electronic control unit; and
a steering mechanism coupled to the housing and communicatively coupled with the electronic control unit, wherein when executed by the processor, the machine readable instructions further cause the robot to:
cause the drive motor to rotate the drive wheel and the steering mechanism to steer the robot to a position in which the image may be projected on the identified projection area.

* * * * *